US009214881B2

(12) United States Patent
Sekimoto et al.

(10) Patent No.: US 9,214,881 B2
(45) Date of Patent: Dec. 15, 2015

(54) POWER CONVERSION APPARATUS

(75) Inventors: Morimitsu Sekimoto, Shiga (JP); Tomoisa Taniguchi, Shiga (JP); Hiroshi Hibino, Shiga (JP); Toshiyuki Maeda, Shiga (JP)

(73) Assignee: DAIKIN INDUSTRIES, LTD., Osaka-Shi (JP)

(*) Notice: Subject to any disclaimer, the term of this patent is extended or adjusted under 35 U.S.C. 154(b) by 265 days.

(21) Appl. No.: 13/980,241

(22) PCT Filed: Jan. 18, 2012

(86) PCT No.: PCT/JP2012/000273
§ 371 (c)(1),
(2), (4) Date: Jul. 17, 2013

(87) PCT Pub. No.: WO2012/098873
PCT Pub. Date: Jul. 26, 2012

(65) Prior Publication Data
US 2013/0300327 A1    Nov. 14, 2013

(30) Foreign Application Priority Data
Jan. 18, 2011 (JP) ................ 2011-007818

(51) Int. Cl.
*H02P 6/10* (2006.01)
*H02M 1/12* (2006.01)
*H02P 21/05* (2006.01)

(52) U.S. Cl.
CPC . *H02P 6/10* (2013.01); *H02M 1/12* (2013.01); *H02P 21/05* (2013.01)

(58) Field of Classification Search
CPC ............. H02M 1/12; H02P 21/05; H02P 6/10
USPC .......... 318/400.23, 400.24, 400.25, 438, 807, 318/808, 599, 503, 729, 400.27
See application file for complete search history.

(56) References Cited

U.S. PATENT DOCUMENTS 5,625,548 A * 4/1997 Gold et al. ...................... 363/98
5,936,855 A * 8/1999 Salmon .......................... 363/46

(Continued)

FOREIGN PATENT DOCUMENTS

| JP | 2002-051589 A | 2/2002 |
| JP | 2002-354826 A | 12/2002 |
| JP | 2005-130666 A | 5/2005 |

OTHER PUBLICATIONS

Haga et al., "Electrolytic capacitor less unity power factor control method using single-phase diode rectifier," The Institute of Electrical Engineers of Japan, H15, Mar. 2003, p. 99.

(Continued)

*Primary Examiner* — Rita Leykin
(74) *Attorney, Agent, or Firm* — Birch, Stewart, Kolasch & Birch, LLP (57) ABSTRACT

A DC link is provided, which includes a capacitor connected in parallel to an output of a converter circuit, and outputs a pulsating DC link voltage. An inverter circuit is provided, which converts an output of the DC link to AC by switching, and supplies the AC to a motor connected thereto. A controller is provided, which controls switching of the inverter circuit so that motor currents pulsate in synchronization with pulsation of a power-supply voltage. The controller controls the switching of the inverter circuit in accordance with a load of the motor or an operational state of the motor, and reduces pulsation amplitude of the motor currents.

7 Claims, 3 Drawing Sheets

(56) References Cited

U.S. PATENT DOCUMENTS

| | | | |
|---|---|---|---|
| 5,953,224 A * | 9/1999 | Gold et al. | 363/98 |
| 7,053,569 B2 * | 5/2006 | Takahashi et al. | 318/400.27 |
| 7,495,410 B2 * | 2/2009 | Zargari | H02M 1/4216 318/438 |
| 7,638,983 B2 * | 12/2009 | Park et al. | 322/20 |
| 7,683,568 B2 * | 3/2010 | Pande | H02M 1/4216 318/438 |
| 7,746,024 B2 * | 6/2010 | Rozman | H02M 1/12 318/722 |
| 7,957,166 B2 * | 6/2011 | Schnetzka et al. | 363/56.03 |
| 8,503,200 B2 * | 8/2013 | Chapman | H02J 3/383 363/131 |
| 2004/0232863 A1 | 11/2004 | Takahashi et al. | |

OTHER PUBLICATIONS

International Search Report issued in PCT/JP2012/000273, mailed on Apr. 24, 2012.

* cited by examiner

FIG.5

POWER CONVERSION APPARATUS

TECHNICAL FIELD

The present disclosure relates to power conversion apparatuses converting input power to predetermined power by switching.

BACKGROUND ART

Some power conversion apparatuses including a converter circuit and an inverter circuit have a capacitor with relatively small capacitance in a DC link to generate pulsation (a ripple) in a DC link voltage, and allow the current of a load to pulsate in synchronization with the DC link voltage, thereby increasing the conduction width of an input current to improve a power factor. (See, for example, PATENT DOCUMENTS 1 and 2, and NON-PATENT DOCUMENT 1.)

CITATION LIST

Patent Document

PATENT DOCUMENT 1: Japanese Patent Publication No. 2002-51589
PATENT DOCUMENT 2: Japanese Patent Publication No. 2005-130666

Non-Patent Document

NON-PATENT DOCUMENT 1: Haga, Saito, and Takahashi, ELECTROLYTIC CAPACITOR LESS UNITY POWER FACTOR CONTROL METHOD USING SINGLE-PHASE DIODE RECTIFIER, The Institute of Electrical Engineers of Japan, Papers of General Meeting H15-4-069 (H15, March), P. 99

SUMMARY OF THE INVENTION

Technical Problem

However, in the above-described examples, the current of a motor connected as a load is reduced to around zero to generate a large current pulsation. Thus, in the examples, the effective value of the motor current may increase to reduce motor efficiency.

The present disclosure was made in view of the problem. It is an objective of the present disclosure to improve the power factor and the efficiency of a motor connected as a load in a power conversion apparatus.

Solution to the Problem

In order to achieve the objective, according to a first aspect of the invention, a power conversion apparatus includes a converter circuit (2) configured to perform full-wave rectification of a power-supply voltage ($v_{in}$) of an AC power supply (6); a DC link (3) including a capacitor (3a) connected in parallel to an output of the converter circuit (2) and configured to output a pulsating DC voltage ($v_{dc}$); an inverter circuit (4) configured to convert an output of the DC link (3) to AC by switching, and supplies the AC to a motor (7) connected thereto; and a controller (5) configured to control the switching so that currents ($i_u$, $i_v$, and $i_w$) of the motor (7) pulsate in synchronization with pulsation of the power-supply voltage ($v_{in}$). The controller (5) controls the switching in accordance with a load of the motor (7) or an operational state of the motor (7), and reduces pulsation amplitude of the currents ($i_u$, $i_v$, and $i_w$).

In this configuration, the capacitance of the capacitor (3a) is set so that the DC link voltage ($v_{dc}$) pulsates more largely, thereby increasing the current conduction width in the converter circuit (2) and improving the power factor. In addition, the switching in the inverter circuit (4) is controlled so that the currents ($i_u$, $i_v$, and $i_w$) of the motor (7) pulsate in synchronization with the pulsation of the power-supply voltage ($v_{in}$). Thus, the harmonic of an input current ($i_{in}$) input from the AC power supply (6) to the power conversion apparatus (1) decreases. Since the pulsation amplitude of the currents ($i_u$, $i_v$, and $i_w$) is reduced in accordance with the load of the motor (7) connected to the inverter circuit (4), or the operational state of the motor (7), effective values of the currents ($i_u$, $i_v$, and $i_w$) flowing to the motor (7) decrease.

According to a second aspect of the invention, in the power conversion apparatus of the first aspect, the controller (5) reduces the pulsation amplitude in accordance with at least one of the currents ($i_u$, $i_v$, and $i_w$), electric power, speed ($\omega_m$), or a torque of the motor (7).

With use of any one of the currents ($i_u$, $i_v$, and $i_w$), the electric power, the speed ($\omega_m$), or the torque of the motor (7), the magnitude of the load of the inverter circuit (4), which is the motor (7), is detected. In this configuration, the pulsation amplitude of the currents ($i_u$, $i_v$, and $i_w$) is controlled using any one of these detected values, or a combination of the detected values. Conventionally, power conversion apparatuses include a mechanism for detecting a phase angle ($\theta_{in}$) of input AC, and the currents ($i_u$, $i_v$, and $i_w$), the speed ($\omega_m$), and the torque of the motor (7). These values are thus easily detected.

According to a third aspect of the invention, in power conversion apparatus of the first or second aspect, the controller (5) controls the switching so that the DC voltage ($v_{dc}$) is higher than zero, and reduces the pulsation amplitude.

In this configuration, the controller (5) controls the switching so that the DC link voltage ($v_{dc}$) is higher than zero. Thus, what is called a "shunt system" is employed as a current detecting means of the motor (7), the switching condition of the inverter circuit (4) is reliably detected.

According to a fourth aspect of the invention, in the power conversion apparatus of the first aspect, the controller (5) reduces the pulsation amplitude at start-up of the motor (7).

In this configuration, since the pulsation amplitude is reduced at the start-up of the motor (7), the torque of the motor (7) at the start-up is controlled to be constant.

According to fifth aspect of the invention, in the power conversion apparatus of the fourth aspect, the controller (5) gradually increases the pulsation amplitude after the start-up of the motor (7).

In this configuration, after the start-up of the motor (7), the pulsation of the motor currents ($i_u$, $i_v$, and $i_w$) reduces the harmonic of the input current ($i_{in}$) input from the AC power supply (6) to the power conversion apparatus (1).

According to a sixth aspect of the invention, in the power conversion apparatus of the first to fifth aspects, the controller (5) includes a current controller (56) performing at least one of proportional control, integral control, or derivative control to reduce deviation of reference values ($i_d^*$, and $i_q^*$) of the currents ($i_u$, $i_v$, and $i_w$) from actual current values ($i_d$, and $i_q$), and changes a control gain of the control when reducing the pulsation amplitude.

In this configuration, the pulsation amplitude of the currents ($i_u$, $i_v$, and $i_w$) of the motor (7) is controlled by at least one of the proportional control, the integral control, or the derivative control.

Advantages of the Invention

According to the first aspect of the invention, where the load of the connected motor (7) is smaller than a predetermined value, the effective values of the currents flowing to the motor (7) decrease, thereby improving the efficiency of the motor (7). That is, the present disclosure improves both of the power factor and the efficiency of the motor (7).

According to the second aspect of the invention, since the load applied to the inverter circuit (4) is easily detected, thereby easily controlling the pulsation amplitude.

According to the third aspect of the invention, where what is called a "shunt system" is employed as the current detecting means of the motor (7), the switching condition of the inverter circuit (4) is reliably detected, thereby reliably controlling the current values of the motor (7).

According to a fourth aspect of the invention, the torque of the motor (7) at the start-up is controlled to be constant, thereby stably controlling the motor (7). In addition, a decrease in the efficiency at the start-up is reduced.

According to a fifth aspect of the invention, the harmonic of the input current ($i_{in}$) input from the AC power supply (6) to the power conversion apparatus (1) is reduced, thereby improving the power factor after the start-up of the motor (7).

According to a sixth aspect of the invention, the current controller (56), which is generally included in the inverter circuit (4), controls the pulsation amplitude of the motor currents ($i_u$, $i_v$, and $i_w$), thereby easily controlling the pulsation amplitude.

DESCRIPTION OF EMBODIMENTS

Embodiments of the present disclosure will be described below in detail with reference to the drawings. Note that the embodiments described below will be set forth merely for the purpose of preferred examples in nature, and are not intended to limit the scope, applications, and use of the invention.

First Embodiment of Present Disclosure

Configuration

Figure 1:
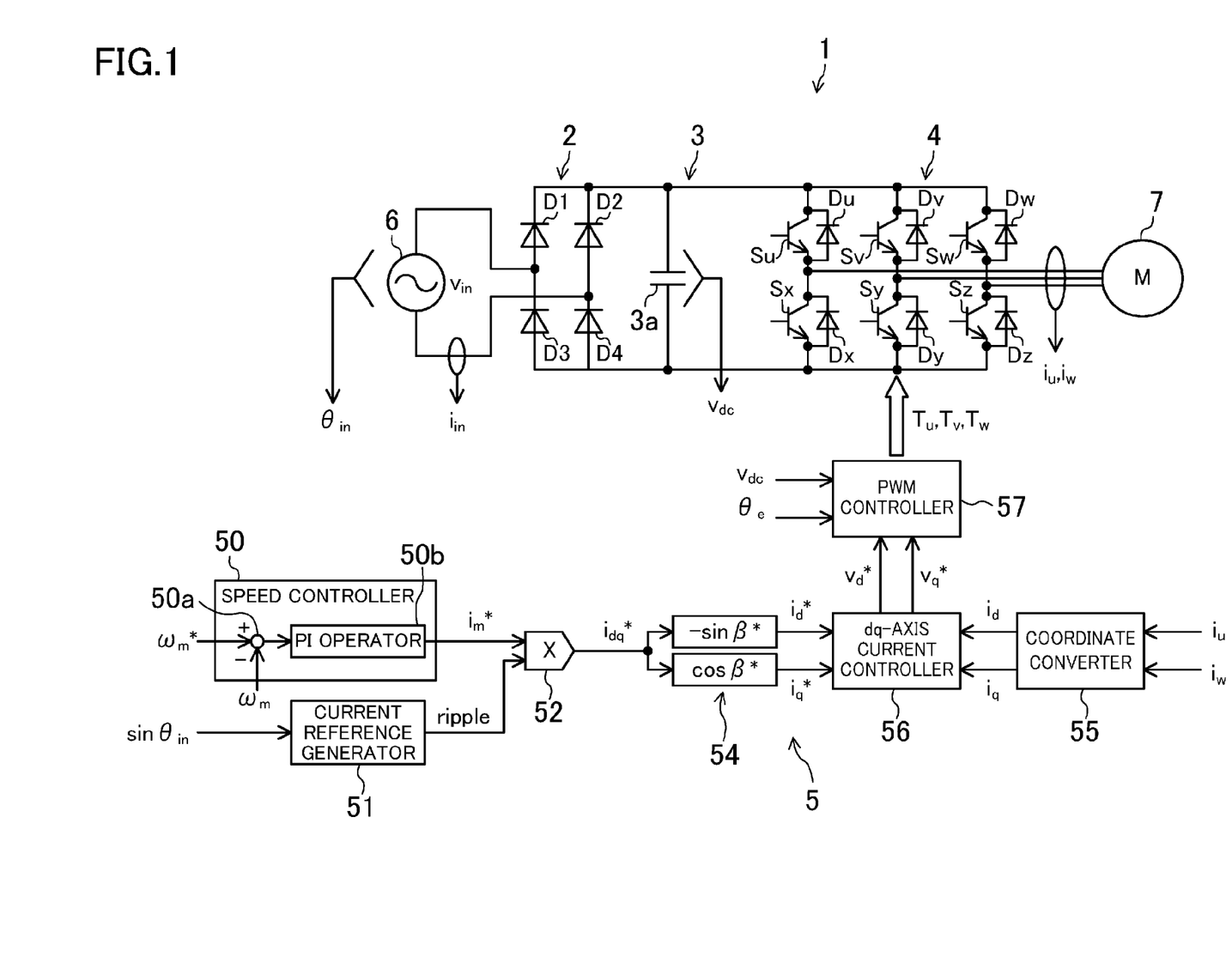
FIG. 1 is a block diagram illustrating the configuration of a power conversion apparatus according to a first embodiment of the present disclosure.

FIG. 1 is a block diagram illustrating the configuration of a power conversion apparatus (1) according to a first embodiment of the present disclosure. As shown in the figure, the power conversion apparatus (1) includes a converter circuit (2), a DC link (3), an inverter circuit (4), and a controller (5). The power conversion apparatus (1) converts AC power supplied from a single-phase AC power supply (6) into power having a predetermined frequency, and then supplies the power to a motor (7). The motor (7) according to this embodiment is a three-phase AC motor for driving a compressor provided in a refrigerant circuit of an air conditioning apparatus.

<Converter Circuit (2)>

The converter circuit (2) is connected to the AC power supply (6) and performs full-wave rectification of AC output from the AC power supply (6) to DC. In this example, the converter circuit (2) is a diode bridge circuit in which a plurality of (four in this embodiment) diodes (D1-D4) are connected together in a bridge configuration. The diodes (D1-D4) perform full-wave rectification of an AC voltage of the AC power supply (6) to a DC voltage.

<DC Link (3)>

The DC link (3) includes a capacitor (3a). The capacitor (3a) is connected in parallel to an output of the converter circuit (2). A DC voltage (i.e., a DC link voltage ($v_{dc}$)) generated at both ends of the capacitor (3a) is applied to input nodes of the inverter circuit (4). The capacitor (3a) is, for example, a film capacitor. This capacitor (3a) has electrostatic capacitance smoothing only a ripple voltage (i.e., a voltage fluctuation) generated in accordance with a switching frequency, when switching devices of the inverter circuit (4), which will be described later, perform switching. That is, the capacitor (3a) is a low-capacitance capacitor, which does not have electrostatic capacitance smoothing the voltage rectified by the converter circuit (2) (i.e., the voltage fluctuation caused by a power-supply voltage). Therefore, the DC link voltage ($v_{dc}$) output from the DC link (3) has large pulsation such that its maximum value is twice or more the minimum value.

<Inverter Circuit (4)>

The input nodes of the inverter circuit (4) are connected in parallel to the capacitor (3a) of the DC link (3). The inverter circuit (4) coverts an output of the DC link (3) into three-phase AC by switching, and supplies the AC to the motor (7) connected thereto. In the inverter circuit (4) according to this embodiment, a plurality of switching devices are connected together in a bridge configuration. This inverter circuit (4) outputs the three-phase AC to the motor (7), and thus has six switching devices (Su, Sv, Sw, Sx, Sy, and Sz). Specifically, the inverter circuit (4) includes three switching legs in each of which two of the switching devices are connected together in series. Each of the switching legs is connected to a phase coil (not shown) of the motor (7) at a middle point between the upper-arm switching device (Su, Sv, or Sw) and the lower-arm switching device (Sx, Sy, or Sz). Each of free-wheeling diodes (Du, Dv, Dw, Dx, Dy, and Dz) are connected in inverse-parallel to a corresponding one of the switching devices (Su, Sv, Sw, Sx, Sy, and Sz). The inverter circuit (4) performs on/off operation of the switching devices (Su, Sv, Sw, Sx, Sy, and Sz) to convert the DC link voltage ($v_{dc}$) input from the DC link (3) to the three-phase AC voltage by switching, and then supplies the voltage to the motor (7). The controller (5) controls the on/off operation.

<Controller (5)>

The controller (5) controls the switching (on/off operation) in the inverter circuit (4) so that currents (i.e., motor currents ($i_u$, $i_v$, and $i_w$)) flowing to the motor (7) pulsate in synchronization with the pulsation of a power-supply voltage ($v_{in}$). In this example, the controller (5) includes a speed controller (50), a current reference generator (51), a multiplier (52), a dq current reference value generator (54), a coordinate converter (55), a dq-axis current controller (56), and a PWM controller (57).

—Speed Controller (50)—

The speed controller (50) includes a subtractor (50a) and a PI operator (50b). The speed controller (50) calculates the difference between a rotation angle frequency ($\omega_m$) of the mechanical angle of the motor (7) and a reference value ($\omega_m$) of the mechanical angle using the subtractor (50a), and performs proportional/integral operation (PI operation) of the calculation result of the subtractor (50a) using the PI operator (50b) to output a first current reference value ($i_m^*$) to the multiplier (52).

—Current Reference Generator (51)—

The current reference generator (51) receives the sine value ($\sin(\theta_{in})$) of the phase angle ($\theta_{in}$) of the power-supply voltage ($v_{in}$), obtains the modulation coefficient (i.e., the ripple) expressed by the following equation (1) based on the input value, and outputs the modulation coefficient (i.e., the ripple) to the multiplier (52).

$$\text{ripple} = k|\sin\theta_{in}| + (1-k) \quad (1)$$

In the equation (1), k is a real number expressed by $0<k\leq 1$. As will be described later in detail, the current reference generator (51) changes the value of k (hereinafter also referred to as a "ripple amount") in accordance with the magnitude of the load, which is the motor (7). In this example, the current reference generator (51) sets k to be a constant value where the load is greater than or equal to a predetermined value, and reduces the value of k where the load is smaller than the predetermined value. When reducing the value of k, the current reference generator (51) checks the DC link voltage ($v_{dc}$) and continuously changes the set value of k, as will be described later in detail. That is, in reducing the value of k, the current reference generator (51) controls the pulsation amplitude of the motor currents ($i_u$, $i_v$, and $i_w$) in accordance with the load. The magnitude of the load is known from at least one of the detected values of the speed ($\omega_m$), the torque, the motor currents ($i_u$, $i_v$, and $i_w$), and the electric power of the motor (7), or a combination of the detected values.

—Multiplier (52)—

The multiplier (52) multiplies the first current reference value ($i_m^*$) output from the speed controller (50) by the modulation coefficient (i.e., the ripple) output from the current reference generator (51), and outputs a drive current reference value ($i_{dq}^*$) to the dq current reference value generator (54). The drive current reference value ($i_{dq}^*$) is expressed by the following equation (2).

$$i_{dq}^* = i_m^* \times \text{ripple} \quad (2)$$

—dq Current Reference Value Generator (54)—

The dq current reference value generator (54) obtains a d-axis current reference value ($i_d^*$) and a q-axis current reference value ($i_q^*$) from the drive current reference value ($i_{dq}^*$) and a current phase reference value ($\beta^*$), which will be described later, based on the following equation (3), and outputs the obtained values to the dq-axis current controller (56). Specifically, the dq current reference value generator (54) multiplies the drive current reference value ($i_{dq}^*$) by the negative sine value ($-\sin\beta^*$) and the cosine value ($\cos\beta^*$) of the predetermined value ($\beta^*$) to generate the d-axis current reference value ($i_d^*$) and the q-axis current reference value ($i_q$), respectively. The value $\beta^*$ is a reference value of a current flowing to the motor (7) in a phase $\beta$.

$$\begin{bmatrix} i_d^* \\ i_q^* \end{bmatrix} = i_{dq}^* \times \begin{bmatrix} -\sin\beta^* \\ \cos\beta^* \end{bmatrix} \quad (3)$$

—Coordinate Converter (55)—

The coordinate converter (55) obtains a d-axis current ($i_d$) and a q-axis current ($i_q$) from the rotation angle (electrical angle ($\theta_e$)) of a rotor (not shown) of the motor (7) and the motor currents ($i_u$, $i_v$, and $i_w$). Specifically, the coordinate converter (55) obtains the d-axis current ($i_d$) and the q-axis current ($i_q$) based on the following equation (4).

$$\begin{bmatrix} i_d \\ i_q \end{bmatrix} = \sqrt{\frac{2}{3}} \begin{bmatrix} \cos\theta_e & \cos(\theta_e - 2\pi/3) & \cos(\theta_e + 2\pi/3) \\ -\sin\theta_e & -\sin(\theta_e - 2\pi/3) & -\sin(\theta_e + 2\pi/3) \end{bmatrix} \begin{bmatrix} i_u \\ i_v \\ i_w \end{bmatrix} \quad (4)$$

—dq-Axis Current Controller (56)—

The dq-axis current controller (56) is an example of the current controller of the present invention. The dq-axis current controller (56) controls the inverter circuit (4) via the PWM controller (57) to reduce the deviation of the reference values ($i_d^*$, and $i_q^*$) of the motor currents ($i_u$, $i_v$, and $i_w$) from the actual current values. In this embodiment, the dq-axis current controller (56) includes three controllers of a proportional controller, an integral controller, and a derivative controller. That is, the dq-axis current controller (56) performs PID operation. Specifically, the dq-axis current controller (56) receives the angular the speed ($\omega_m$) of the electrical angle, which is the speed of the motor (7), the d-axis current ($i_d$), the q-axis current ($i_q$), the d-axis current reference value ($i_d^*$), and the q-axis current reference value ($i_q^*$). Then, the dq-axis current controller (56) outputs a d-axis voltage reference value ($v_d^*$) and a q-axis voltage reference value ($v_q^*$) to the PWM controller (57) based on the following equation (5). In the equation (5), Ld and Lq represent the motor inductance of the d axis and the q axis, and $\phi a$ represents a motor back electromotive force (EMF) constant. $R_a$ represents motor coil resistance. Reference character s represents a derivative operator. $K_{Pd}$, $K_{Id}$, and $K_{Dd}$ represent a proportional control gain, an integral control gain, and a derivative control gain, respectively. In the equation (5), the first and second terms in the right-hand side are based on a conventional motor model, and the third term is based on PID operation.

$$\begin{bmatrix} v_d^* \\ v_q^* \end{bmatrix} = \begin{bmatrix} R_a + sL_d & -\omega_e L_q \\ \omega_e L_d & R_a + sL_q \end{bmatrix} \begin{bmatrix} i_d \\ i_q \end{bmatrix} + \begin{bmatrix} 0 \\ \omega_e \phi_s \end{bmatrix} + \begin{bmatrix} \left(K_{Pd} + \frac{1}{s}K_{Id} + sK_{Dd}\right)(i_d^* - i_d) \\ \left(K_{Pq} + \frac{1}{s}K_{Iq} + sK_{Dq}\right)(i_q^* - i_q) \end{bmatrix} \quad (5)$$

—PWM Controller (57)—

The PWM controller (57) receives the d-axis voltage reference value ($v_d^*$), the q-axis voltage reference value ($v_q^*$), the DC link voltage ($v_{dc}$), and the electrical angle ($\theta_e$), and generates reference value signals ($T_u$, $T_v$, and $T_w$) for controlling the on/off operation of the switching devices (Su, Sv, Sw, Sx, Sy, and Sz) based on these values. Specifically, first, the PWM controller (57) obtains phase voltage reference values ($v_u^*$, $v_v^*$, and $v_w^*$) based on the following equation (6).

$$\begin{bmatrix} v_u^* \\ v_v^* \\ v_w^* \end{bmatrix} = \sqrt{\frac{2}{3}} \begin{bmatrix} \cos\theta_e & -\sin\theta_e \\ \cos(\theta_e - 2\pi/3) & -\sin(\theta_e - 2\pi/3) \\ \cos(\theta_e + 2\pi/3) & -\sin(\theta_e + 2\pi/3) \end{bmatrix} \begin{bmatrix} v_d^* \\ v_q^* \end{bmatrix} \quad (6)$$

Then, the PWM controller (57) obtains on-time $\tau_j$ of the upper-arm switching devices (Su, Sv, and Sw) in the phases from the phase voltage reference values ($v_u^*$, $v_v^*$, and $v^*$) and the DC link voltage ($v_{dc}$) based on the following equation (7). In the equation (7), Tc represents a carrier period. In the equation (7), j=u, v, w. For example, $\tau_u$ represents the time when the upper-arm switching device (Su) is on in the U phase.

The PWM controller (57) sets the on-time $\tau_j$ to be the carrier period (Tc) where the calculation result of the equation (7) is greater than the carrier period (Tc), and to be 0 where the calculation result is smaller than 0.

$$\tau_j = \frac{v_j * + 0.5 \cdot v_{dc}}{v_{dc}} T_c \qquad (7)$$

After that, the PWM controller (57) outputs to the inverter circuit (4), the reference value signals ($T_u$, $T_v$, and $T_w$) for performing the on/off operation of the switching devices (Su, Sv, Sw, Sx, Sy, and Sz) in the phases in accordance with the on-time $\tau_j$ in each carrier period (Tc).

<Operation of Power Conversion Apparatus (1)>

In this embodiment, since the DC link includes the low-capacitance capacitor (3a), the DC link voltage ($v_{dc}$) largely pulsates. The pulsation of the DC link voltage ($v_{dc}$) increases the current conduction widths of the diodes (D1-D4) of the converter circuit (2), thereby improving the power factor. The controller (5) controls switching in the inverter circuit (4) so that the motor currents ($i_u$, $i_v$, and $i_w$) pulsate in synchronization with the pulsation of the power-supply voltage ($v_{in}$). This reduces the harmonic of an input current ($i_{in}$) input from the AC power supply (6) to the power conversion apparatus (1). This embodiment is characterized by the control of the inverter circuit (4) at a low-load time such as a low-speed operation of the motor (7). The operation of the power conversion apparatus (1) at the low-load time will be described below.

Figure 2:
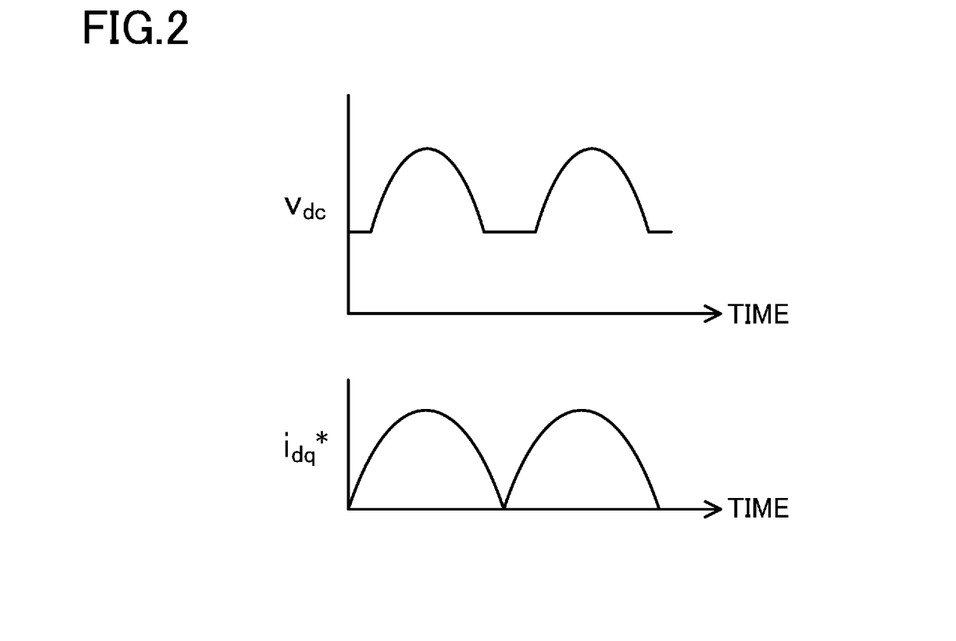
FIG. 2 illustrates waveforms of a DC link voltage and a drive current reference value, where k=1 in the below equation (1).

The operation of a conventional power conversion apparatus at a low-load time corresponds to where k=1 in the equation (1). FIG. 2 illustrates waveforms of the DC link voltage ($v_{dc}$) and the drive current reference value ($i_{dq}*$) where k=1 in the equation (1). Where k=1, as shown in the figure, the drive current reference value ($i_{dq}*$) decreases to around zero so that the motor current largely pulsates. As a result, in the conventional power conversion apparatus, the effective values of the motor currents may increase at the low-load time, thereby reducing the motor efficiency. In the power conversion apparatus (1) according to this embodiment, the inverter circuit (4) may operate where k=1 in accordance with the operational state (e.g., at a high-load time etc.).

In general, the electrostatic capacitance of the capacitor (3a) of the DC link (3) is set so as to smooth the ripple according to the switching of the switching devices (Su, Sv, Sw, Sx, Sy, and Sz) where the load is the maximum. In this setting of the capacitance, as shown in FIG. 2, the DC link voltage ($v_{dc}$) does not decrease to zero around a zero-cross of the voltage of the AC power supply (6) and the capacitor (3a) is charged to some extent at the low-load time. The conventional power conversion apparatus reduces the current of the motor (7) connected as a load to around zero while the DC link voltage ($v_{dc}$) exists to some extent to generate large current pulsation. In this state, the motor (7) cannot produce any torque around the zero-cross.

However, where the capacitor (3a) is charged around the zero-cross, the motor (7) considered to produce a torque utilizing the charging voltage of the capacitor (3a). Specifically, the capacitor (3a) is discharged by reducing the pulsation (i.e., the ripple) of the motor currents ($i_u$, $i_v$, and $i_w$). This reduces the effective values of the motor currents ($i^u$, $i_v$, and $i_w$) required to produce the torque as compared to conventional techniques.

Figure 3:
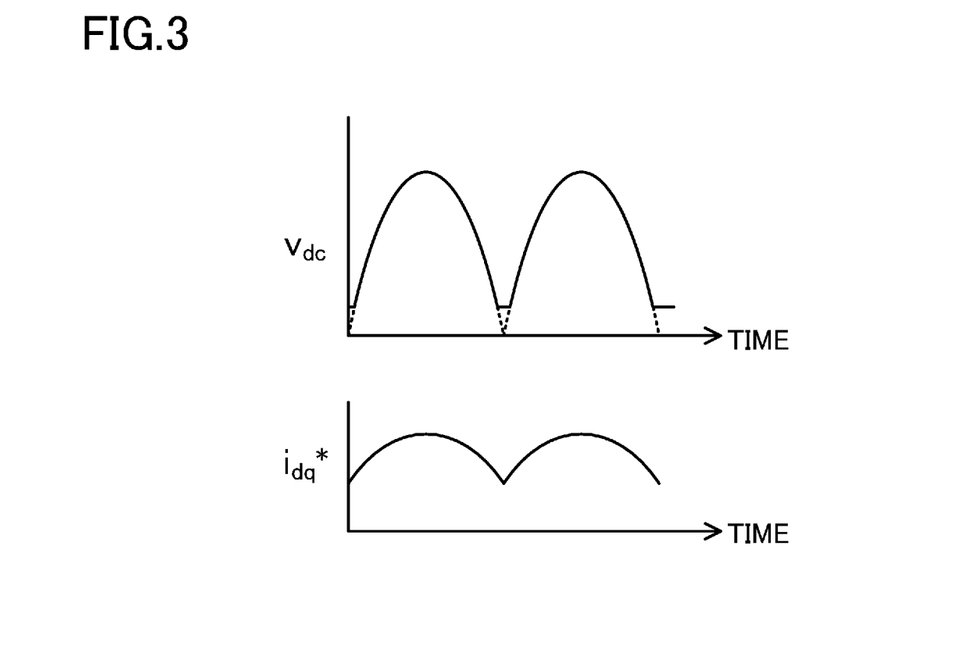
FIG. 3 illustrates waveforms of the DC link voltage and the drive current reference value, where k is smaller than 1 in the below equation (1).

More specifically, in the power conversion apparatus (1), the current reference generator (51) of the controller (5) reduces the value of k in the equation (1) at the low-load time as compared to a high-load time to obtain the modulation coefficient (i.e., the ripple). Where the value of k is smaller, the modulation coefficient (i.e., the ripple) of the voltage of the AC input from the AC power supply (6) around the zero-cross is great as compared to the case where k=1. That is, the amplitude of the modulation coefficient (i.e., the ripple) is smaller. FIG. 3 illustrates waveforms of the DC link voltage ($v_{dc}$) and the drive current reference value ($i_{dq}*$) where k is smaller than 1 in the equation (1). As shown in the figure, the drive current reference value ($i_{dq}*$) is great around the zero-cross as compared to the case where k=1.

Figure 4:
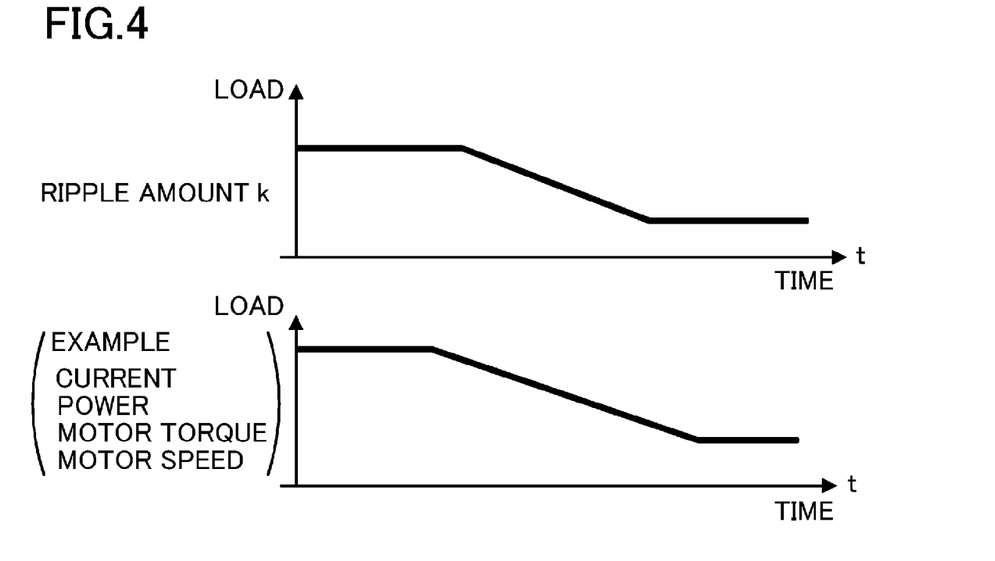
FIG. 4 is a timing chart illustrating the relationship between a ripple amount and a load.p

As described above, the magnitude of the load is known from one of the detected values of the speed ($\omega_m$), the torque, the motor currents ($i_u$, $i_v$, and $i_w$), and the electric power of the motor (7), or a combination of the detected values. FIG. 4 is a timing chart illustrating the relationship between a ripple amount (k) and a load. As shown in FIG. 4, as the value of the load decreases from a predetermined value, the controller (5) gradually reduces the value of k. As such, when the drive current reference value ($i_{dq}*$) increases around the zero-cross, the d-axis current reference value ($i_d*$) and the q-axis current reference value ($i_q*$) output from the dq current reference value generator (54) increase (see the equation (3)). As a result, the d-axis voltage reference value ($v_d*$) and the q-axis voltage reference value ($v_q*$) output from the dq-axis current controller (56) are great around the zero-cross as compared to the case where k=1 (see the equation (5)). This extends the on-time of the upper-arm switching devices (Su, Sv, and Sw) in the predetermined phases, discharges the charge in the capacitor (3a), and reduces the pulsation amplitude of the motor currents ($i_u$, $i_v$, and $i_w$). As such, the pulsation amplitude decreases and the effective values of the motor currents ($i^u$, $i_v$, and $i_w$) decrease, thereby reducing copper loss of the motor (7) and improving the motor efficiency.

The effective values of the motor currents ($i_u$, $i_v$, and $i_w$) decrease with a decrease in the value of k in the equation (1), and thus the advantage of improving the motor efficiency is considered to increase with the decrease in the value of k. However, if the value of k is too small, i.e., the ripple of the motor currents ($i_u$, $i_v$, and $i_w$) decrease too much, the capacitor (3a) is completely discharged to bring the DC link voltage ($v_d$) to zero. When the DC link voltage ($v_{dc}$) is zero, and for example, the system (what is called "shunt system") using shunt resistance is employed as a current detecting means of the motor (7), the switching condition of the inverter circuit (4) (i.e., as to which of the upper- and lower-arms of the inverter circuit (4) is on) is not found not to detect the currents of the motor (7). Therefore, where the shunt system is employed, there is a need to control the switching in the inverter circuit (4) so that the DC link voltage ($v_d$) is higher than zero (see FIG. 3).

Therefore, where the shunt system is employed in this embodiment, there is a need to adjust the value of k so that the DC link voltage ($v_{dc}$) is higher than zero. As an example, the value of k may be set so that the DC link voltage ($v_{dc}$) is equal to about the on-voltage of the free-wheeling diodes (Du, Dv, Dw, Dx, Dy, and Dz). In this embodiment, when reducing the value of k, the current reference generator (51) checks the DC link voltage ($v_{dc}$) and continuously changes the set value of k.

If the value of k is too small, the power-supply power factor may decrease or the harmonic component of the input current may increase. Therefore, there is also a need to set the value of k in accordance with the operational state.

Advantages of Embodiment

As described above, in this embodiment, the DC link voltage ($v_{dc}$) largely pulsates in the DC link (3) to increase the current conduction width in the converter circuit (2), thereby improving the power factor. At a low-load time, the effective values of the currents flowing to the motor (7) are reduced, thereby improving efficiency of the motor (7).

Second Embodiment of Present Disclosure

In a second embodiment, example control at start-up of a motor (7) will be described. In this embodiment, the circuit configuration itself of a power conversion apparatus (1) is the same as that in the first embodiment.

For example, in an inverter circuit including a capacitor with low capacitor in a DC link, when a motor current pulsates in synchronization with a power supply, efficiency may decrease or control may be unstable at a low-load time such as start-up of the motor. In this embodiment, the inverter circuit (4) is controlled at the start-up of the motor (7) so that a torque, i.e., motor currents ($i_u$, $i_v$, and $i_w$) is constant.

Figure 5:
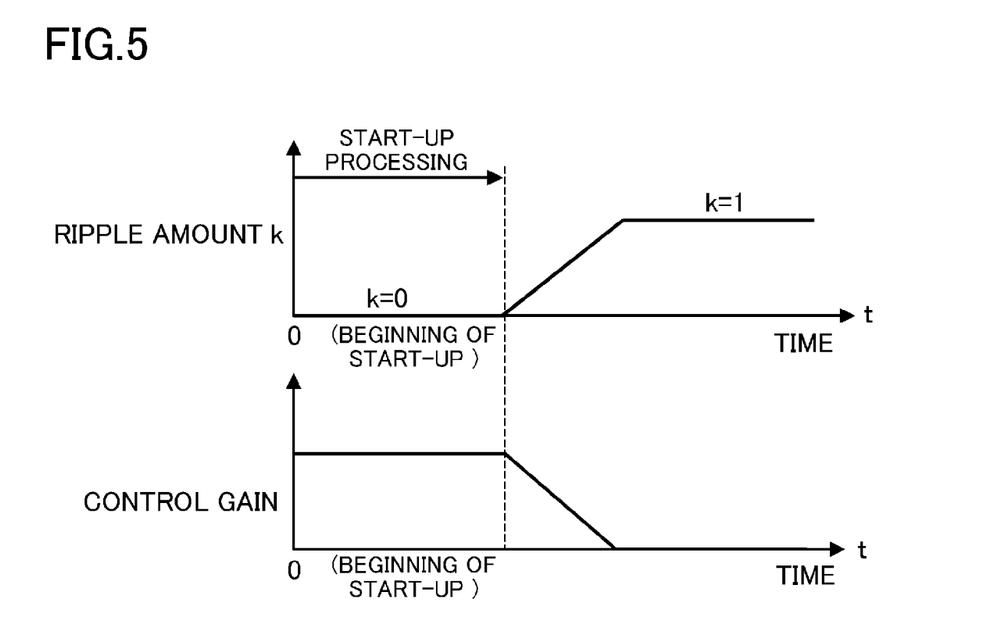
FIG. 5 is a timing chart illustrating the relationship between the ripple amount and a control gain in a dq-axis current controller at start-up of a motor.

FIG. 5 is a timing chart illustrating the relationship between a ripple amount (k) and a control gain of a dq-axis current controller (56) at the start-up of the motor (7). The dq-axis current controller (56) is, for example, a controller performing at least one of proportional control, integral control, or derivative control to reduce the deviation of values ($i_d^*$ and $i_q^*$) of the motor currents ($i_u$, $i_v$, and $i_w$) from actual current values. For example, where the dq-axis current controller (56) performs any one of the control, the control gain of the dq-axis current controller (56) is the control gain of the selected control. Where the dq-axis current controller (56) performs a combination of a plurality of control types, the control gain of the dq-axis current controller (56) is the control gain of at least one of the control types.

As shown in FIG. 5, in the period (i.e., a start-up processing period) of the start-up processing, the dq-axis current controller (56) sets the control gain relatively high. The start-up processing is for bringing the motor (7) from a stopped state to an operating state at target rotational speed.

In this example, the controller (5) controls the inverter circuit (4) where k=0 in the start-up processing period. As a result, the motor currents ($i_u$, $i_v$, and $i_w$) do not pulsate in the start-up processing period. When the start-up processing ends, i.e., when the motor (7) operates at the target rotational speed, the dq-axis current controller (56) gradually reduces the control gain. On the other hand, the controller (5) gradually increases the value of k in accordance with the magnitude of the load after the end of the start-up processing. This gradually increases the pulsation amplitude of the motor currents ($i_u$, $i_v$, and $i_w$). In this example, the value of k (i.e., the ripple amount) is controlled to be 1.

Advantages of Embodiment

As described above, in this embodiment, until the motor (7) starts and operates at the predetermined rotational speed, the motor currents ($i_u$, $i_v$, and $i_w$) are controlled not to pulsate. Thus, in this embodiment, the torque of the motor (7) is controlled to be constant at the start-up, thereby stably controlling the motor (7). This also reduces a decrease in the efficiency at the start-up. Since the pulsation amplitude of the motor currents ($i_u$, $i_v$, and $i_w$) gradually increases after the end of the start-up processing, the power factor is improved after the start-up.

Other Embodiments

How to obtain the modulation coefficient (i.e., the ripple) (the equation (1)) is merely an example. For example, in the equation (1), various types of calculation such as calculation using the square of the sine value instead of the absolute value of the sine value of the phase angle ($\theta_{in}$) may be employed. The point is that the modulation coefficient (i.e., the ripple) is set so that the pulsation amplitude of the motor currents ($i_u$, $i_v$, and $i_w$) changes in accordance with the load and the operational state of the motor (7).

The configuration of the dq-axis current controller (56) is merely an example. For example, the dq-axis current controller (56) may be any one of a proportional controller, an integral controller, or a derivative controller, or may be a combination of a proportional controller, an integral controller, and a derivative controller to perform control to reduce the deviation of the reference values ($i_d^*$ and $i_q^*$) of the motor currents ($i_u$, $i_v$, and $i_w$) from the actual current values.

INDUSTRIAL APPLICABILITY

The present disclosure is useful for a power conversion apparatus converting input power to predetermined power by switching.

DESCRIPTION OF REFERENCE CHARACTERS

1 Power Conversion Apparatus
2 Converter Circuit
3 DC Link
3a Capacitor
4 Inverter Circuit
5 Controller
7 Motor
56 dq-Axis Current Controller (Current Controller)

The invention claimed is:
1. A power conversion apparatus comprising:
a converter circuit configured to perform full-wave rectification of a power-supply voltage of an AC power supply;
a DC link including a capacitor connected in parallel to an output of the converter circuit and configured to output a pulsating DC voltage;
an inverter circuit configured to convert an output of the DC link to AC by switching, and supplies the AC to a motor connected thereto; and
a controller configured to control the switching so that currents of the motor pulsate in synchronization with pulsation of the power-supply voltage, wherein
the controller controls the switching in accordance with reduction in a load of the motor, and reduces pulsation amplitude of the currents.
2. The power conversion apparatus of claim 1, wherein the controller reduces the pulsation amplitude in accordance with at least one of the currents, electric power, speed, or a torque of the motor.
3. The power conversion apparatus of claim 1, wherein the controller controls the switching so that the DC voltage is higher than zero, and reduces the pulsation amplitude.
4. The power conversion apparatus of claim 1, wherein the controller reduces the pulsation amplitude at start-up of the motor.

5. The power conversion apparatus of claim 4, wherein the controller gradually increases the pulsation amplitude after the start-up of the motor.

6. The power conversion apparatus of claim 1, wherein the controller includes a current controller performing at least one of proportional control, integral control, or derivative control to reduce deviation of reference values of the currents from actual current values, and changes a control gain of the control when reducing the pulsation amplitude.

7. The power conversion apparatus of claim 2, wherein the controller controls the switching so that the DC voltage is higher than zero, and reduces the pulsation amplitude.

* * * * *